(12) United States Patent
Katz

(10) Patent No.: US 6,378,915 B1
(45) Date of Patent: Apr. 30, 2002

(54) PIPE COUPLING

(75) Inventor: Oded Katz, Doar Na Menashe (IL)

(73) Assignee: Plasson Ltd., Maagan Michael (IL)

( * ) Notice: Subject to any disclaimer, the term of this patent is extended or adjusted under 35 U.S.C. 154(b) by 0 days.

(21) Appl. No.: 09/744,389

(22) PCT Filed: Aug. 18, 1999

(86) PCT No.: PCT/IL99/00445

§ 371 Date: Feb. 26, 2001

§ 102(e) Date: Feb. 26, 2001

(87) PCT Pub. No.: WO00/11389

PCT Pub. Date: Mar. 2, 2000

(30) Foreign Application Priority Data

Aug. 24, 1998 (IL) ................................................ 125899
Nov. 30, 1998 (IL) ................................................ 127327

(51) Int. Cl.[7] ............................ F16L 19/03; F16L 19/04; F16L 19/08
(52) U.S. Cl. ..................... 285/342; 285/382.7; 285/379; 285/354; 277/604; 277/626
(58) Field of Search ............................. 285/382.7, 342, 285/343, 379, 354; 277/604, 607, 612, 626

(56) References Cited

U.S. PATENT DOCUMENTS 2,394,351 A * 2/1946 Wurzburger ............. 285/382.7
2,452,277 A * 10/1948 Woodling ................... 285/342
2,644,700 A * 7/1953 Woodling ................ 285/382.7

* cited by examiner

Primary Examiner—Eric K. Nicholson

(57) ABSTRACT

A pipe coupling includes a body member (10) formed with a bore (11) for receiving one end of a pipe (P) to be coupled; a sealing ring (20) and a compression sleeve (30) receivable within the bore (11); a radially-deformable gripping ring (40) having one end abuttable against the compression sleeve (30), a securing nut (50) threaded on the body member (10) and engageable with the gripping ring (40) to move the gripping ring (40) axially and to effect a sealing action via the compression sleeve (30) and the sealing ring (20), and also to compress the gripping ring (40) radially to effect a gripping action of the pipe (P) received in the bore (11); and an axially-extending limit element (45) between the gripping ring (40) and the body member (10) effective to cause the nut (50), when tightened; (a) in an initial stage, to move the gripping ring (40) and the compression sleeve (30) until the limit element engages (45) prevents further axial movement of the gripping ring (40); and (b) in a final stage, to radially deform the gripping ring (40) to produce the gripping action, and then to compress the sealing ring (20) against the internal annular shoulder (14) of the body member to produce the sealing action.

22 Claims, 8 Drawing Sheets

PIPE COUPLING

FIELD AND BACKGROUND OF THE INVENTION

The present invention relates to pipe couplings, and particularly to pipe couplings of the compression type, such as are described, for example in U.S. Pat. Nos. 4,025,093 and 4,083,587, assigned to the assignee of the present application.

Pipe couplings of this type generally comprise: a body member formed with a bore for receiving one end of a pipe to be coupled, an annular shoulder to enclose the pipe when received in the bore, and threads for threadedly receiving a securing nut; a sealing ring receivable within the bore and engageable with the annular shoulder for producing a sealing action with respect to the pipe when received in the bore; a compression sleeve also receivable within the bore and engageable with the sealing ring for compressing the sealing ring against the annular shoulder of the body member; a radially-deformable gripping ring having one end abuttable against the compression sleeve, and also having an inner surface producing a gripping action with respect to the pipe when the gripping ring is radially deformed; and a securing nut having threads mating with the threads on the body member and engageable with the gripping ring to move the gripping ring axially and to effect the sealing action via the compression sleeve and the sealing ring, and also to compress the gripping ring radially to effect the gripping action of the pipe received in the bore.

Pipe couplings of the foregoing type will hereinafter be referred to as "pipe couplings of the type herein described".

Pipe couplings of the type herein described, which are presently in wide-spread use, normally require pushing the pipe through the seal (typically an O-ring) in the bore of the body member in order to achieve compression of the O-ring on the pipe, and thus a leak free joint. However, for pipes of large diameters, the operation of pushing the pipe through the O-ring seal requires a large force, making the operation very difficult, and sometimes even necessitating an extra operation of chamfering the pipe end for this purpose.

A further disadvantage in pipe couplings of the type herein described now in use is that such couplings do not tolerate substantial variations in the pipe diameter so that precise pipe diameter tolerances must be maintained, or a large number of differences in diameter sizes; improved sealing even or damaged pipes, particularly since the seal produces double sealing points; and convenient disassembly of the coupling, since relaxation of the sealing ring releases the pipe end for removal and also "springs" the compression sleeve, the split ring and the nut during disassembly.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
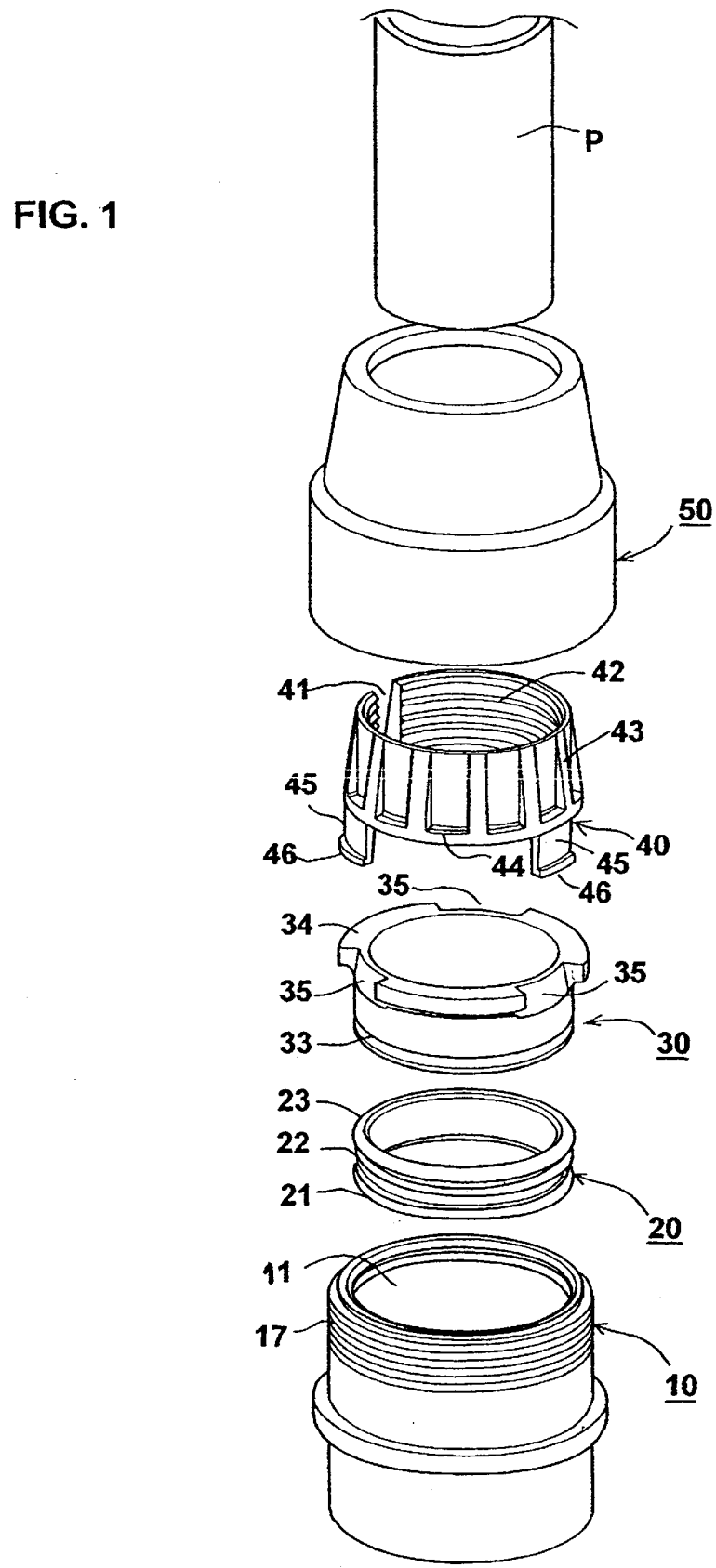
FIG. 1 is an exploded perspective view illustrating one form of pipe coupling constructed in accordance with the present invention.
Figure 2:
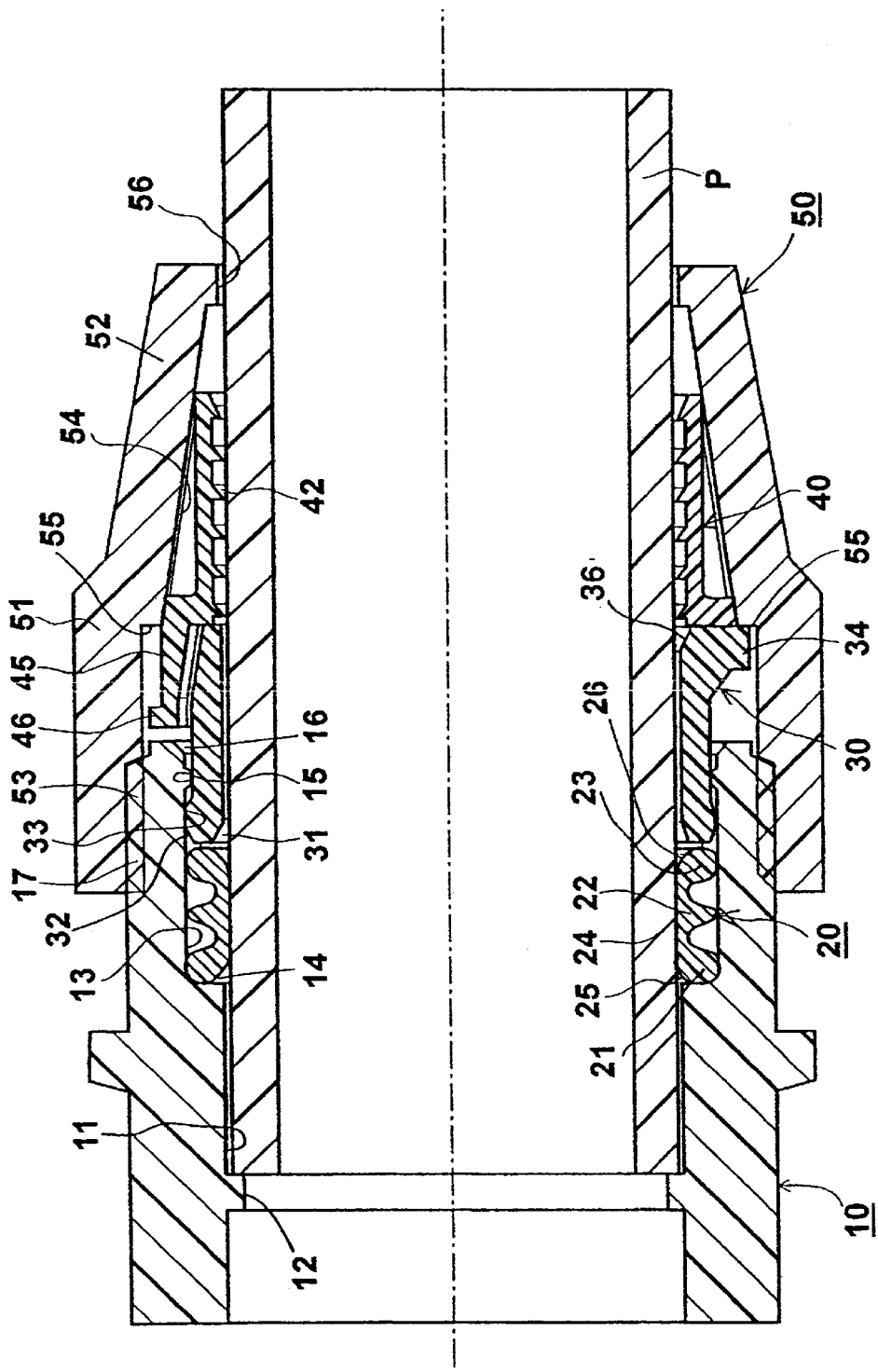
FIG. 2 is an enlarged sectional view illustrating the pipe coupling of FIG. 1 during the initial tightening stage of the securing nut.
Figure 3:
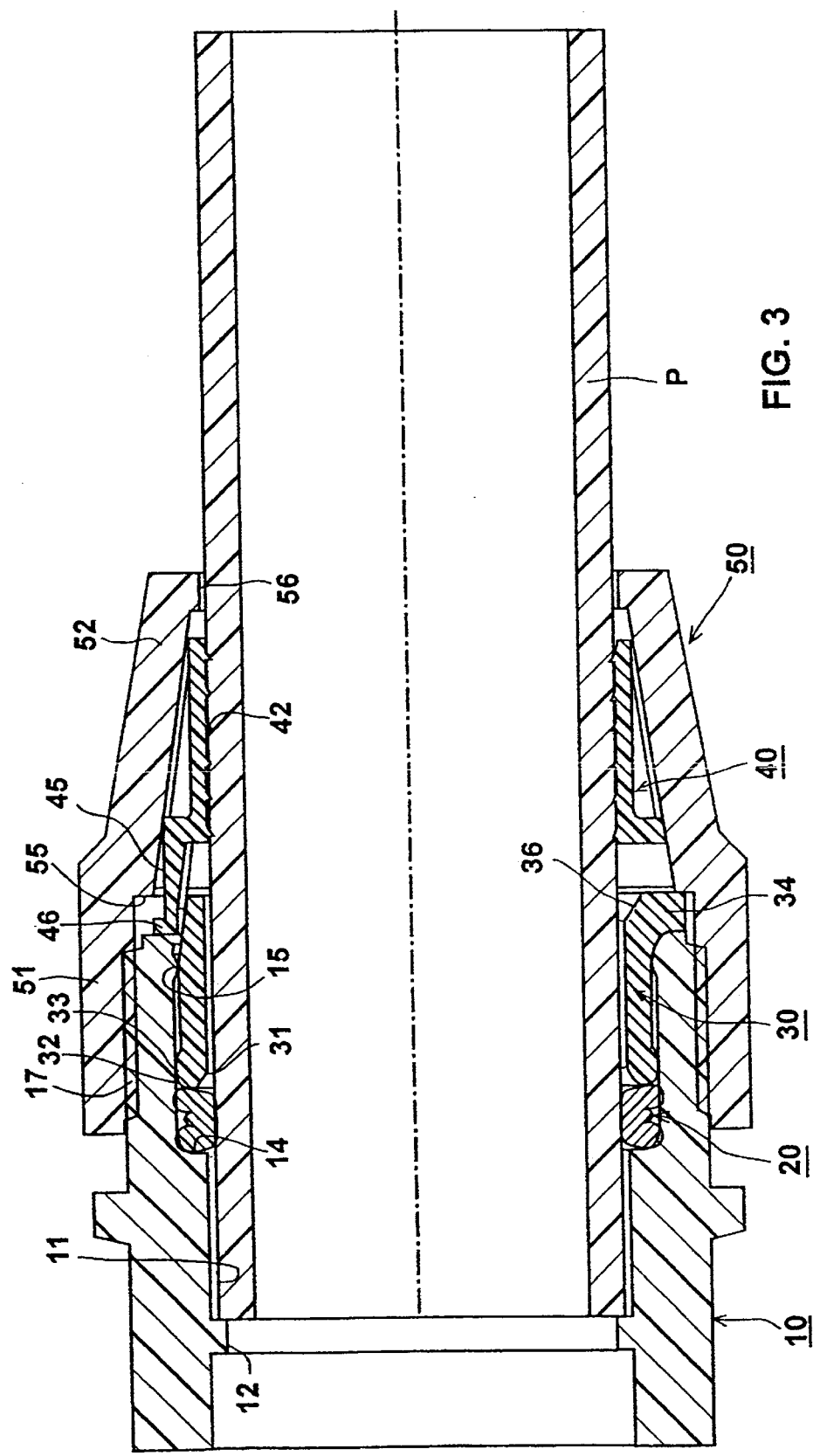
FIG. 3 illustrates the pipe coupling of FIG. 1 in the final tightened state of the nut.

The Embodiment of FIGS. 1–3

The pipe coupling illustrated in FIGS. 1–3 is of the type herein described (as defined above) but modified to include the features of the present invention set forth above, and as to be described more particularly below. As shown in FIG. 1, such a pipe coupling includes the following basic parts: a body member 10; a sealing ring 20; addition, its outer surface is formed with a shallow annular rib 33 at the end of the sleeve facing body member 10. Rib 33 is cooperable with rib 15 of the body member to releasably hold the compression sleeve, and with it the resilient ring 20, during the assembling of the coupling.

The opposite end of the compression sleeve 30, i.e., the end facing the gripping ring 40, is formed with a radial flange 34 having a plurality (in this case three) axially-extending slots or recesses 35 spaced around its periphery, for reasons to be described below. The inner surface of flange 34 facing the gripping ring 40 is inwardly tapered in the direction of the gripping ring, as shown at 36 in FIGS. 2 and 3.

The gripping ring 40 is made of a hard, elastic plastic material, such as an acetal resin. It is formed with a slit 41 extending axially for the complete length of the ring to make it radially deformable. Its inner surface is formed with annular barbs or ribs 42 adapted to penetrate the outer surface of the pipe P when the ring is radially contracted. The outer surface of split ring 40 is formed with a plurality of axially-extending circumferentially-spaced ribs 43 of increasing height joined to an annular rib 44 at the end of the split ring 40 facing the compression sleeve 30.

The end of gripping ring 40 facing compression sleeve 30 is further formed with a plurality of axially-extending projections 45, serving as axially-extending limit elements between the gripping ring 4 and the body member 10. These limit elements 45 are in the form of fingers and are effective to assure that, during the tightening of the nut 50 as will be described below, first the sealing ring will be partly compressed to produce a seal, then the gripping ring will be compressed to firmly grip the pipe inserted into the body member, and finally the sealing ring will be more firmly compressed to assure a good seal, even when using a sealing ring of slightly larger diameter than the outer diameter of the pipe to facilitate insertion of the pipe.

There is one finger 45 of each of the recesses 35 formed in flange 34 of the compression sleeve 30. Each finger 45 includes an outwardly-extending shoulder 46 at its outer tip. The inner surface of each finger 45 is outwardly tapered in the direction of the compression sleeve 30, as shown particularly in FIGS. 2 and 3. The outer surfaces of the ribs 43 of gripping 40 are tapered, decreasing in height towards the nut 50. surface of pipe P. The radial deformation of gripping ring 40 produces a firm gripping action between it and the pipe.

Continued rotation of nut 50 moves the compression sleeve 30 axially of the pipe, by virtue of the engagement of shoulder 55 of the nut flange 34 of the compression sleeve, thereby moving the compression sleeve towards shoulder 14. This further compresses the sealing ring 20 against the annular shoulder 14 of body member 10, to produce a firm sealing action, as shown in FIG. 3.

For disassembling the pipe P, it is only necessary to rotate nut 50 in the loosening direction, permitting the pipe P to be pulled out of the coupling.

It will thus be seen that the illustrated coupling provides a number of important advantages. Since the sealing ring 20 in its relaxed condition can be made of larger diameter than the pipe P to be inserted, a pipe may be easily inserted into the coupling and through the seal. Also, since the pipe is more freely inserted through the sealing ring, there is better assurance that the end of the pipe P will be in its proper position, firmly abutting annular shoulder 12 of body member 10, before the final tightening of the nut 50 which effects the firm gripping of the pipe.

The illustrated coupling also produces an excellent seal since it provides two sealing points on the outer surface with respect to the body member, and a sealing surface of substantial area on its inner surface with respect to the pipe P. The described seal produces a substantial displacement of both its inner and outer sealing surfaces, allowing for a relatively large sealing stroke particularly when the middle rib 22 is also included, thereby enabling the seal to accommodate a wide variation of pipe diameters. In addition, when the stress is removed from the seal by loosening nut 52 to permit disassembly, the seal produces a "spring action" when returning to its original unstressed condition, pushing out the compression sleeve and split ring, thereby facilitating the disassembly of the coupling.

The assembly of the coupling is facilitated by the provision of the shallow annular ribs 15 and 33 on the body member 10 and compression sleeve 30, respectively, which releasably retain these parts together during the initial assembly and also during installation or repair in the field. so as to function in the same manner as described above with respect to FIG. 4–6 during the tightening of the nut.

Figure 9:
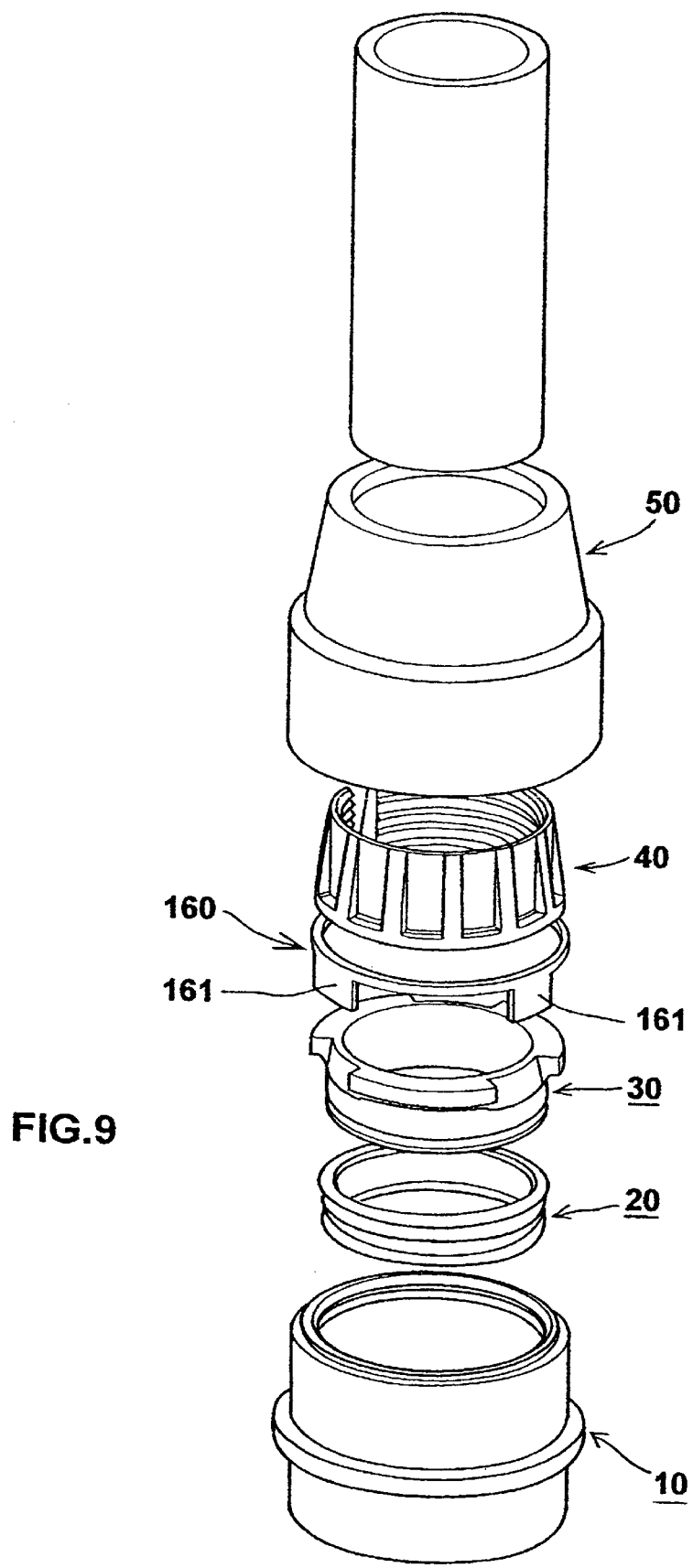
FIG. 9 is a view similar to that of FIG. 8, but showing the abutment ring between the gripping ring and the compression sleeve.

FIG. 9 illustrates the variation wherein the abutment ring 160 is interposed between the gripping ring 40 and the compression sleeve 30, with its axially-extending limit elements, in the form of fingers 161, facing the body member 10. Thus, fingers 161 will function in the same manner as fingers 45 in the embodiment of FIGS. 1–3during the tightening of the nut 50.

While the invention has been described with respect to several preferred embodiments, it will be appreciated that they are set forth merely for purposes of example, and that many other variations, modifications and applications of the invention may be made.

What is claimed is:

1. A pipe coupling comprising:
   a body member formed with a bore for receiving one end of a pipe to be coupled, an internal annular shoulder to enclose the pipe when received in the bore, and threads for threadedly receiving a securing nut;
   a sealing ring receivable within said bore and engageable with said annular shoulder for producing a sealing action with respect to the pipe when received in the bore;
   a compression sleeve also receivable within said bore and engageable with said sealing ring for compressing said sealing ring against said annular shoulder of the body member;
   a radially-deformable gripping ring having one end abuttable against said compression sleeve, and also having an inner surface producing a gripping action with respect to the pipe when the gripping ring is radially deformed;
   and a securing nut having threads mating with the threads on the body member and engageable with said gripping ring to move the gripping ring axially and to effect said sealing action via the compression sleeve and the sealing ring, and also to compress the gripping ring radially to effect said gripping action of the pipe received in said bore;
   characterized in that said pipe coupling further comprises an axially-extending limit element between said gripping ring and said body member effective to cause the nut, when tightened:
   (a) in an initial stage, to move the gripping ring and the compression sleeve, and to start compressing the sealing ring, until said limit element prevents further axial movement of the gripping ring; and
   (b) in a final stage, to radially deform the gripping ring to produce said gripping action, and then to further compressing said sealing ring against said internal annular shoulder of the body member to produce said sealing action.

2. The coupling according to claim 1, wherein said nut is formed with an internal annular shoulder engageable with the end of the compression sleeve facing the gripping ring, which annular shoulder engages said end of the compression sleeve to move the compression sleeve and the sealing ring axially in said final stage, compressing said sealing ring against said internal annular shoulder of the body member.

3. The coupling according to claim 2, wherein:
   said compression sleeve is formed with a radical flange at the end thereof facing the gripping ring;
   said limit element includes a plurality of fingers spaced circumferentially around said abutting end of the gripping ring and extending axially towards the body member;
   and said radial flange on the compression sleeve is formed with a recess for accommodating each of said fingers of the gripping ring.

4. The coupling according to claim 3, wherein said plurality of fingers are integrally formed on said gripping ring and are abuttable with said body member in said initial nut tightening stage (a).

5. The coupling according to claim 3, wherein said plurality of fingers are integrally formed on said body member and are abuttable with said gripping ring in said initial nut tightening stage (a).

6. The coupling according to claim 3, wherein said plurality of fingers are integrally formed on an abutment ring adjacent said body member and are abuttable with said gripping ring in said initial nut tightening stage (a).

7. The coupling according to claim 3, wherein said plurality of fingers are integrally formed on an abutment ring adjacent said gripping ring and are abutable with said gripping ring in said initial nut tightening stage (a).

8. The coupling according to claim 1, wherein said gripping ring is a split ring having an outer tapered surface cooperable with an inner tapered surface on the nut, and an inner barbed surface for gripping the pipe.

9. The coupling according to claim 1, wherein said sealing ring is integrally formed on its outer surface with at least two annular ribs, one at each end.

10. The coupling according to claim 9, wherein the end ribs of the sealing ring are of substantially semi-circular cross-section, and the sealing ring is also integrally formed with a middle rib of substantially triangular cross-section.

11. The coupling according to claim 1, wherein the bore in the body member is formed with an annular rib at the end thereof opposite to that formed with said annular shoulder, and the end of the compression sleeve facing the sealing ring is formed with an external rib dimensioned to releasably retain the compression sleeve, and the sealing ring, within the body member bore during the preliminary assembly of the coupling.

12. A pipe coupling comprising:

a body member formed with a bore for receiving one end of a pipe to be coupled, an annular shoulder to enclose the pipe received in the bore, and threads for threadedly receiving a securing nut;

a sealing ring receivable within said bore and engageable with said annular shoulder for producing a sealing action with respect to the pipe when received in the bore;

a compression sleeve also receivable within said bore and engageable with said sealing ring for compressing said sealing ring against said annular shoulder of the body member;

a radially-deformable gripping ring having one end abuttable against said compression sleeve, and also having an inner surface producing a gripping action with respect to the pipe when the gripping ring is radially deformed;

and a securing nut having threads mating with the threads on the body member and engageable with said gripping ring to move the gripping ring axially and to effect said sealing action via the compression sleeve and the sealing ring, and also to compress the gripping ring radially to effect said gripping action of the pipe received in said bore;

said sealing ring being integrally formed on its outer surface with at least two annular ribs, one at each end.

13. The coupling according to claim 12, wherein the end ribs of the sealing ring are of substantially semi-circular cross-section, and the sealing ring is also integrally formed with a middle rib of substantially triangular cross-section.

14. The coupling according to claim 12, wherein said pipe coupling further comprises an axially-extending limit element between said gripping ring and said body member effective to cause the nut, when tightened;

(a) in an initial stage, to move the gripping ring and the compression sleeve, and to start compressing the sealing ring, until said limit element prevents further axial movement of the gripping ring, and (b) in a final stage, to radially deform the gripping ring to produce said gripping action, and then to further compressing said sealing ring against said internal annular shoulder of the body member to produce said sealing action.

15. The coupling according to claim 14, wherein said nut is formed with an internal annular shoulder engageable with the end of the compression sleeve facing the gripping ring, which annular shoulder engages said end of the compression sleeve to move the compression sleeve and the sealing ring axially in said final stage, compressing said sealing ring against said internal annular shoulder of the body member.

16. The coupling according to claim 15, wherein:

said compression sleeve is formed with a radial flange at the end thereof facing the gripping ring;

said limit element includes a plurality of fingers spaced circumferentially around said abutting end of the gripping ring and externally axially towards the body member;

said radial flange on the compression sleeve formed with a recess for accommodating each of said fingers of the gripping ring;

and in said initial (a), one end of the sealing ring is also moved axially to partially compress the sealing ring, which sealing ring is further compressed to produce said sealing action during said final stage (b).

17. A pipe coupling comprising:

a body member formed with a bore for receiving one end of a pipe to be coupled, an annular shoulder to enclose the pipe received in bore, and threads for threadedly receiving a securing nut;

a sealing ring receivable within said bone and engageable with said annular shoulder for producing a sealing action with respect to the pipe when received in the bore;

a compression sleeve also receivable within said bore and engageable with said sealing ring for compressing said sealing ring against said annular shoulder of the body member;

a radially-deformable gripping ring having one end abuttable against said compression sleeve, and also having an inner surface producing a gripping action with respect to the pipe when the gripping ring is radially deformed;

and a securing nut having threads mating with the threads on the body member and engageable with said gripping ring to move the gripping ring axially and to effect said sealing action via the compression sleeve and the sealing ring, and also compress the gripping ring radially to effect said gripping action of the pipe received in said bore;

wherein the bore in the body member is formed with an annular rib at the end thereof opposite to that formed with said annular shoulder, and the end of the compression sleeve facing the sealing ring is formed with an external rib dimensioned to releasably retain the compression sleeve, and the sealing ring, within the body member bore during the preliminary assembly of the coupling.

18. The coupling according to claim 17, wherein said pipe coupling further comprises an axially-extending limit between said gripping ring and said body member effective to cause the nut, when tightened;

(a) in an initial stage, to move the gripping ring and the compression sleeve until said limit element prevents further axial movement of the gripping ring, and (b) in a final stage, to radially deform the gripping ring to produce said gripping action, and then to compress said sealing ring against said internal annular shoulder of the body member to produce said sealing action.

19. The coupling according to claim 18, wherein said nut is formed with an internal annular shoulder engageable with the end of the compression sleeve facing the gripping ring, which annular shoulder engages said end of the compression sleeve to move the compression sleeve and the sealing ring axially in said final stage, compressing said sealing ring against said internal annular shoulder of the body member.

20. The coupling according to claim 19, wherein said compression sleeve is formed with a radial flange at the end thereof facing the gripping ring,
- said limit element includes a plurality of fingers spaced circumferentially around said abutting end of the gripping ring and extending axially towards the body member;
- said radial flange on the compression sleeve is formed with a recess for accommodating each of said fingers of the gripping ring;

and in said initial stage (a), one end of the sealing ring is also moved axially to partially compress the sealing ring, which sealing ring is further compressed to produce said sealing action during said final stage (b).

21. The coupling according to claim 17, wherein said sealing ring is integrally formed on its outer surface with at least two annular ribs, one at each end.

22. The coupling according to claim 21 wherein the end ribs of the sealing ring are of substantially circular cross-section, and the sealing ring includes a middle rib of substantially triangular cross-section.

* * * * *

UNITED STATES PATENT AND TRADEMARK OFFICE
CERTIFICATE OF CORRECTION

PATENT NO.   : 6,378,915 B1
DATED        : April 30, 2002
INVENTOR(S)  : Oded Katz It is certified that error appears in the above-identified patent and that said Letters Patent is hereby corrected as shown below:

<u>Column 1,</u>
Line 46, after "large number of" insert:

-- different-size couplings must be produced for the different diameter pipes to assure good sealing and gripping actions.

OBJECTS AND BRIEF SUMMARY OF THE INVENTION

An object of the present invention is to provide a pipe coupling having advantages in one or more of the above respects.

According to one aspect of the present invention, there is provided a pipe coupling of the type herein described, characterized in that the pipe coupling further comprises an axially-extending limit element extending axially between the end face of the gripping ring and the body member effective to cause the nut, when tightened: (a) in an initial stage, to move the gripping ring and the compression sleeve, and to start compressing the sealing ring, until the limit element engages the body member and prevents further axial movement of the gripping ring; and (b) in a final stage, to radially deform the gripping ring to produce the gripping action, and then to further compressing the sealing ring against the internal annular shoulder of the body member to produce the sealing action.

According to another respect of the invention, the sealing ring is integrally formed on its surface with at least two annular ribs, one at each end, and a middle rib inbetween.

According to a still further aspect of the present invention, there is provided a pipe coupling of the type herein described wherein the bore in the body member is formed with an annular rib projecting radially inwardly of the bore at a location spaced axially outwardly from the annular shoulder, and the compression sleeve is formed with an external rib at an intermediate location on its outer surface located to engage the annular rib of the body member and to releasable retain the compression sleeve, and the sealing ring, within the body member bore during the preliminary assembly of the coupling.

UNITED STATES PATENT AND TRADEMARK OFFICE
CERTIFICATE OF CORRECTION

PATENT NO. : 6,378,915 B1
DATED : April 30, 2002
INVENTOR(S) : Oded Katz

It is certified that error appears in the above-identified patent and that said Letters Patent is hereby corrected as shown below:

Column 1 (cont'd),

As will be described more particularly below, a pipe coupling constructed in accordance with the foregoing features provides a number of important advantages including: convenient assembly, since the particular seal, in its relaxed condition, introduces very little resistance to the forceful entry of the pipe during assembly; assurance that the pipe end will be properly positioned with respect to the seal to produce a good sealing action, since the pipe end reaches its final position before final tightening of the nut; increased diameter range of pipes capable of being coupled, since the two-ribbed (or a three-ribbed) sealing ring can accommodate substantial --

Column 2,
Line 25, after "body member 10, a sealing ring 20;" insert:

-- a compression sleeve 30; a gripping ring 40; and a securing nut 50. Fig. 2 illustrates these parts in an initial assembled condition; and Fig. 3 illustrates these parts in the final assembled condition.

Body member 10 is preferably of plastic, but may be of another material e.g., metal. It is formed with a bore 11 for receiving one end of a pipe P to be coupled, and with an internal annular shoulder 12 for defining the position of the pipe when received within bore 11. Bore 11 is enlarged in diameter at its outer end, as shown at 13, for receiving the sealing ring 20 and the compression sleeve 30, as will be described more particularly below. This enlargement in the bore also defines an annular shoulder 14 which limits the position of the sealing ring 20. The inner surface of body member 10 at the enlarged end 13 of bore 11 is formed with an annular rib 15 for releasable retaining the compression sleeve 30, and with it the sealing ring 20, during the initial assembling of the coupling, as will also be described below. The outer edge of enlarged bore 13 is chamfered, as shown at 16, to facilitate the insertion of the sealing ring 20 and compression sleeve 30.

Body member 10 is further formed with external threads 17 on its outer surface, at the end facing the securing nut 50, for securing the parts together.

The sealing ring 20 is made of elastomeric material. Preferably it is of an inner diameter slightly larger than the outer diameter of the pipe P to be coupled, but may also be equal to or slightly smaller than the pipe diameter, in order to accommodate variations in

UNITED STATES PATENT AND TRADEMARK OFFICE
CERTIFICATE OF CORRECTION

PATENT NO.    : 6,378,915 B1
DATED         : April 30, 2002
INVENTOR(S)   : Oded Katz It is certified that error appears in the above-identified patent and that said Letters Patent is hereby corrected as shown below:

Column 2 (cont'd),
  the diameter of the pipes.

Sealing ring 20 is integrally formed on its outer surface with at least two, preferably three, annular ribs 21, 22, 23. The two end ribs 21, 23 are of substantially semi-circular cross-section. The middle rib 22 is optional, since it serves to prevent collapse of the sealing ring. When provided, it preferably is of substantially triangular cross-section. The inner surface 24 of sealing ring 20 is smooth but is rounded at its opposite ends, as shown at 25 and 26.

The compression sleeve 30 is preferably also of plastic material, e.g., of the same material as the body member 10, but may also be of another material, e.g., metal. It has an inner diameter slightly larger than the outer diameter of the pipe P to be coupled. The end of compression sleeve 30 facing body member 10 is preferably chamfered on its inner and outer surfaces, as shown at 31 and 32, respectively. In --

Column 3,
Line 2, after "nut 50." insert:

-- Nut 50 includes a cylindrical section 51 facing body member 10, and a conical section 52 facing away from the body member. The inner surface of nut section 51 is formed with threads 53 to mate with thread 17 on the body member; and the inner surface of section 52 is tapered, as shown at 54, corresponding to the taper of the outer surface of the ribs 43 of the split ring 40. The inner surface of nut 50 is further formed with an annular shoulder 55 at the juncture of its two sections 51 and 52. Nut 50 is further formed with a bore 56 of slight larger diameter than the pipe P to be coupled.

The illustrated coupling may be used in the following manner for coupling a pipe P.

First, nut 50 is loosened by rotating it in the loosening direction, i.e., away from the body member 10, sufficiently to relax the gripping ring 40 and also the sealing ring 20. In the relaxed condition of the gripping ring 40, the inner diameter of its barbs 42 is slightly larger than (nut may be equal to or even slightly smaller than) the outer diameter of the pipe P to be coupled; and similarly in the relaxed condition of the sealing ring 20, its inner diameter 24 is also slightly larger than the outer diameter of the pipe P to be coupled.

UNITED STATES PATENT AND TRADEMARK OFFICE
CERTIFICATE OF CORRECTION

PATENT NO. : 6,378,915 B1
DATED : April 30, 2002
INVENTOR(S) : Oded Katz

It is certified that error appears in the above-identified patent and that said Letters Patent is hereby corrected as shown below:

Column 3 (cont'd), 50, it moves axially the compression sleeve 30 and the sealing ring 20 towards annular shoulder 14 of body member 10 to start the compression of the sealing ring. Gripping ring 40 is still in its relaxed condition when shoulders 46 of fingers 45 of the gripping ring are still slightly spaced axially from the end of body member 10, as shown in the upper part of Fig. 2.

This initial tightening of nut 50 continues until shoulders 46 of the gripping ring fingers 45 abut the end of body member 10. This continues the compression of the sealing ring 20. Also, the gripping ring 40 is no longer able to move axially of the pipe P, such that further tightening of the nut causes the tapered surface 54 of the nut to radially contract the split-ring 40 and to embed its barbs 42 into the outer --

Line 44, before "so" insert:

-- The Embodiments of Figs. 4 – 9

In the embodiment of Figs. 1 – 3, the plurality of fingers 45, which serve as axially-extending limit elements between the gripping ring 40 and the body member 10 during the initial nut tightening stage, are integrally formed on the gripping ring 40 as described above. Figs. 4 – 9 illustrate possible variations in the construction of these axially-extending limit elements without affecting their functioning during the nut tightening operation.

To facilitate understanding, those elements in the embodiments of Figs. 4 – 9 which are the same as in Figs. 1 – 3 are identified by the same reference numerals; and the new elements are identified by reference numerals over "100".

Figure 4:
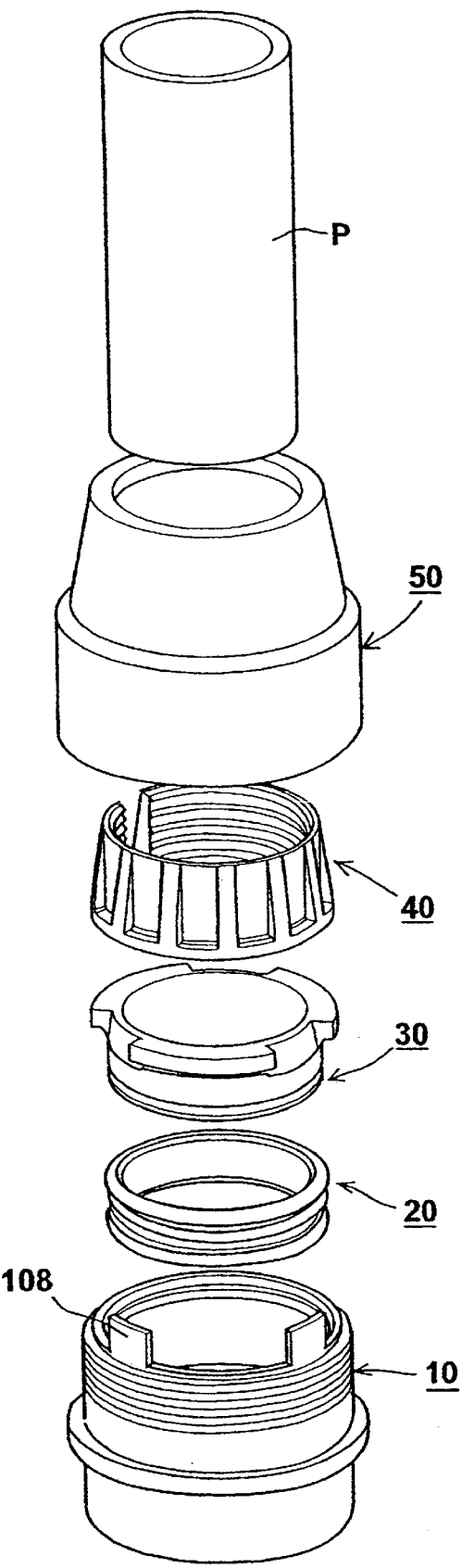
FIGS. 4, 5 and 6, are views corresponding to FIGS. 1, 2 and 3, respectively, illustrating another form of pipe coupling constructed in accordance with the present invention wherein the limit elements, in the form of a plurality of fingers, are integrally formed with the body member, rather than with the gripping ring.
Figure 5:
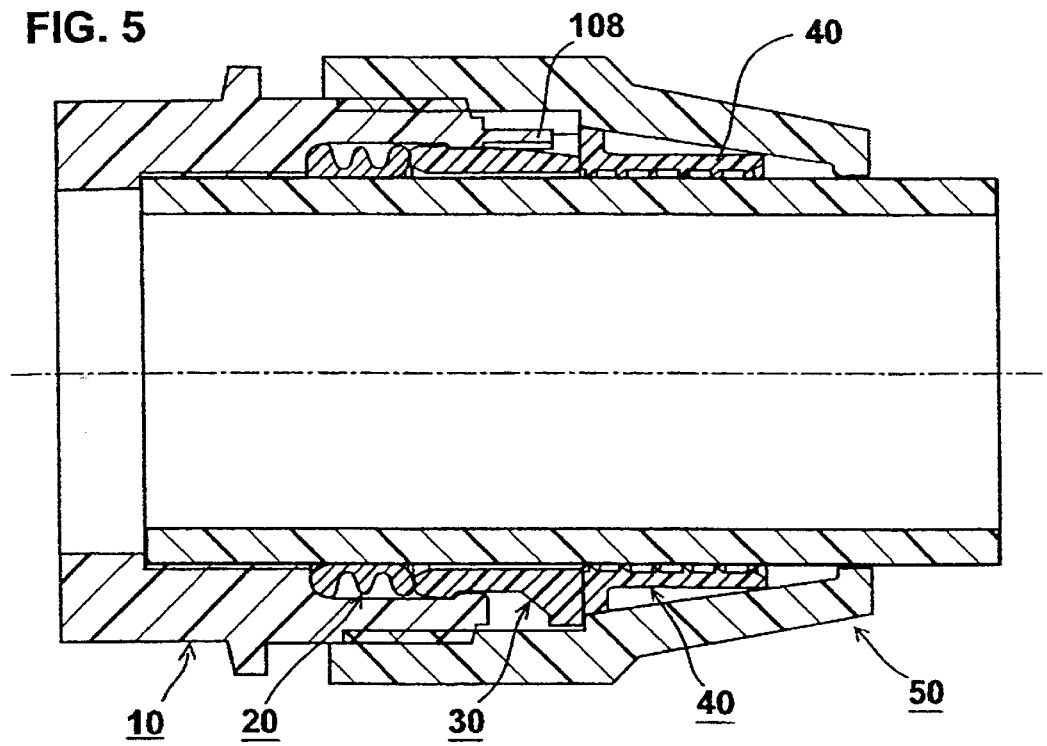
Figure 6:
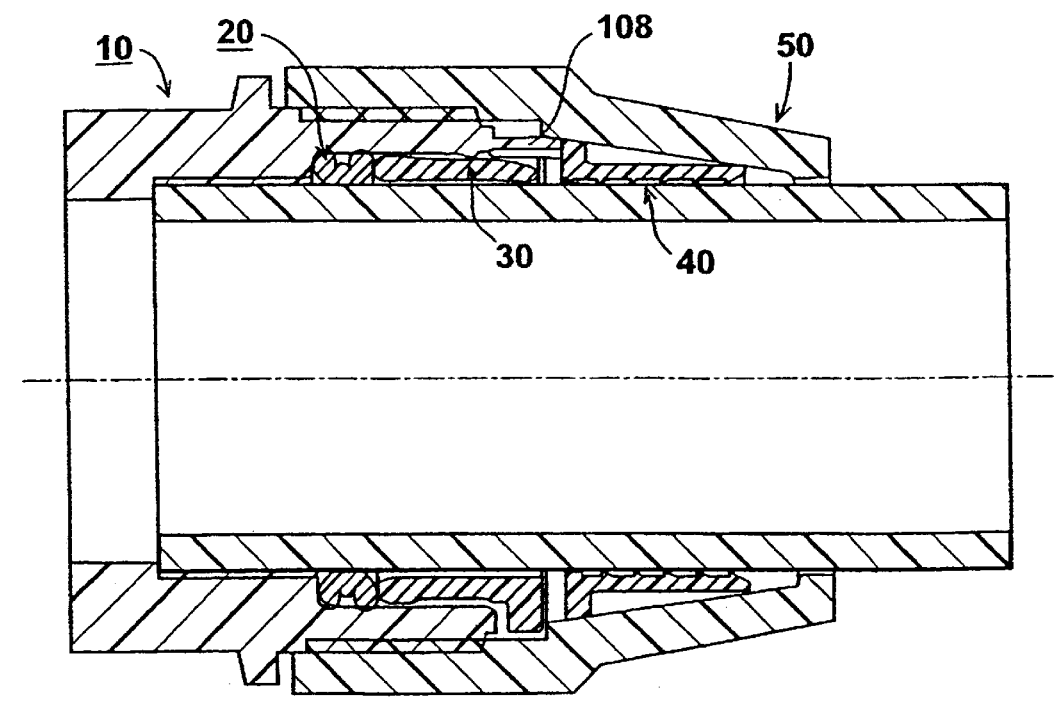

Thus, in the embodiment illustrated in Figs. 4 – 6, the axially-extending limit elements corresponding to fingers 45 in Figs. 1 – 3 are integrally formed in the body member 10, wherein they are shown as fingers 108. During the initial tightening stage of the nut 50 (Fig. 5), the tips of fingers 108 engage the end of the gripping ring 40 to start the compression of the sealing ring 20, and also to prevent further axial movement of the gripping ring 40. The arrangement is such that in the final tightening stage (Fig. 6), the gripping ring 40 is deformed (i.e., radially contracted) to produce the gripping action, and

UNITED STATES PATENT AND TRADEMARK OFFICE
CERTIFICATE OF CORRECTION

PATENT NO.   : 6,378,915 B1
DATED        : April 30, 2002
INVENTOR(S)  : Oded Katz It is certified that error appears in the above-identified patent and that said Letters Patent is hereby corrected as shown below:

Column 3 (cont'd), then the sealing ring 20 is further compressed against the internal annular shoulder of the body member to produce the sealing action. The construction and operation of the coupling of Figs. 4 – 6 are otherwise the same as described above with respect to Figs. 1 – 3.

Figure 7:
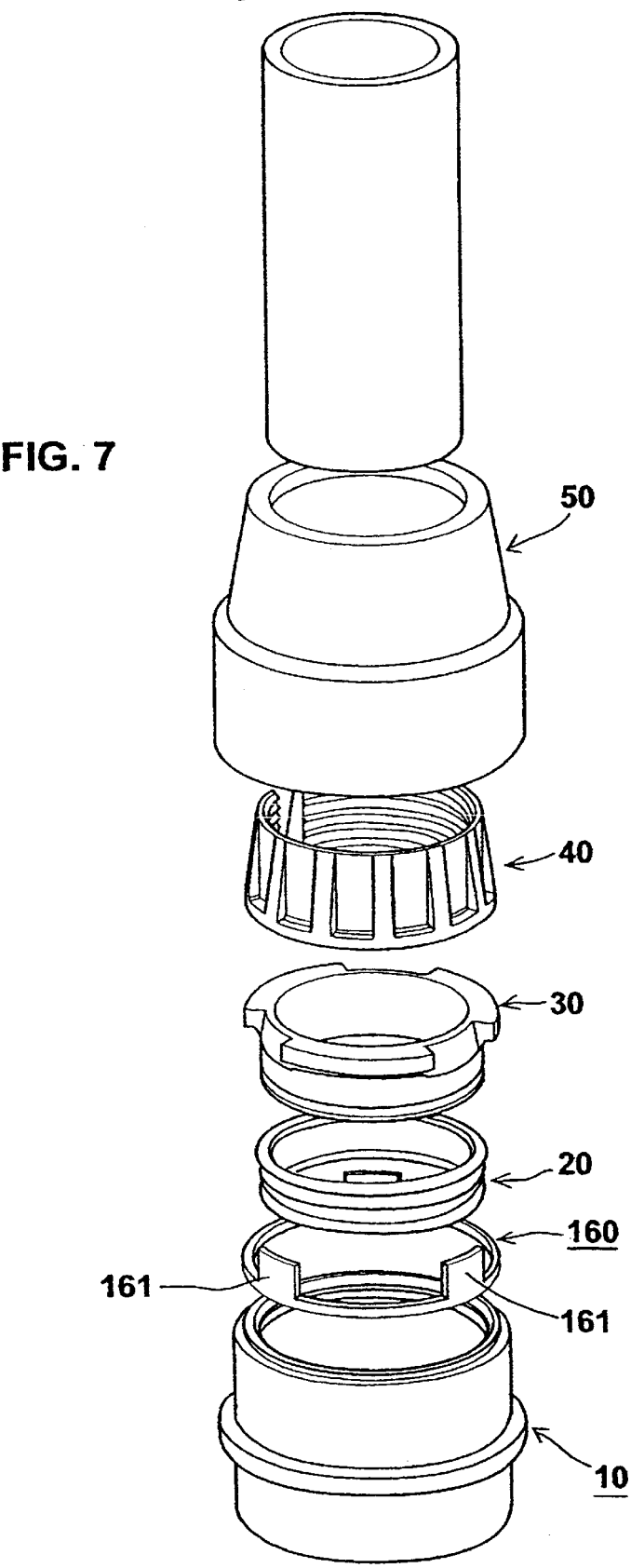
FIG. 7 is a view similar to that of FIG. 4, but showing the fingers integrally formed on an abutment ring between the body member and the sealing ring.

Fig. 7 illustrates a modification in the construction, wherein the axially-extending limit elements corresponding to fingers 45 in Figs. 1 – 3 are integrally formed on an abutment ring, generally designated 160, interposed between the body member 10 and the sealing ring 20. Thus, as shown in Figs. 7, these axially-extending limit elements are in the form of fingers 161 integrally formed on abutment ring 160 and facing the gripping ring 40 so as to function in the same manner as fingers 108 in the embodiment of Figs. 4 – 6 during the tightening of the nut 50.

Figure 8:
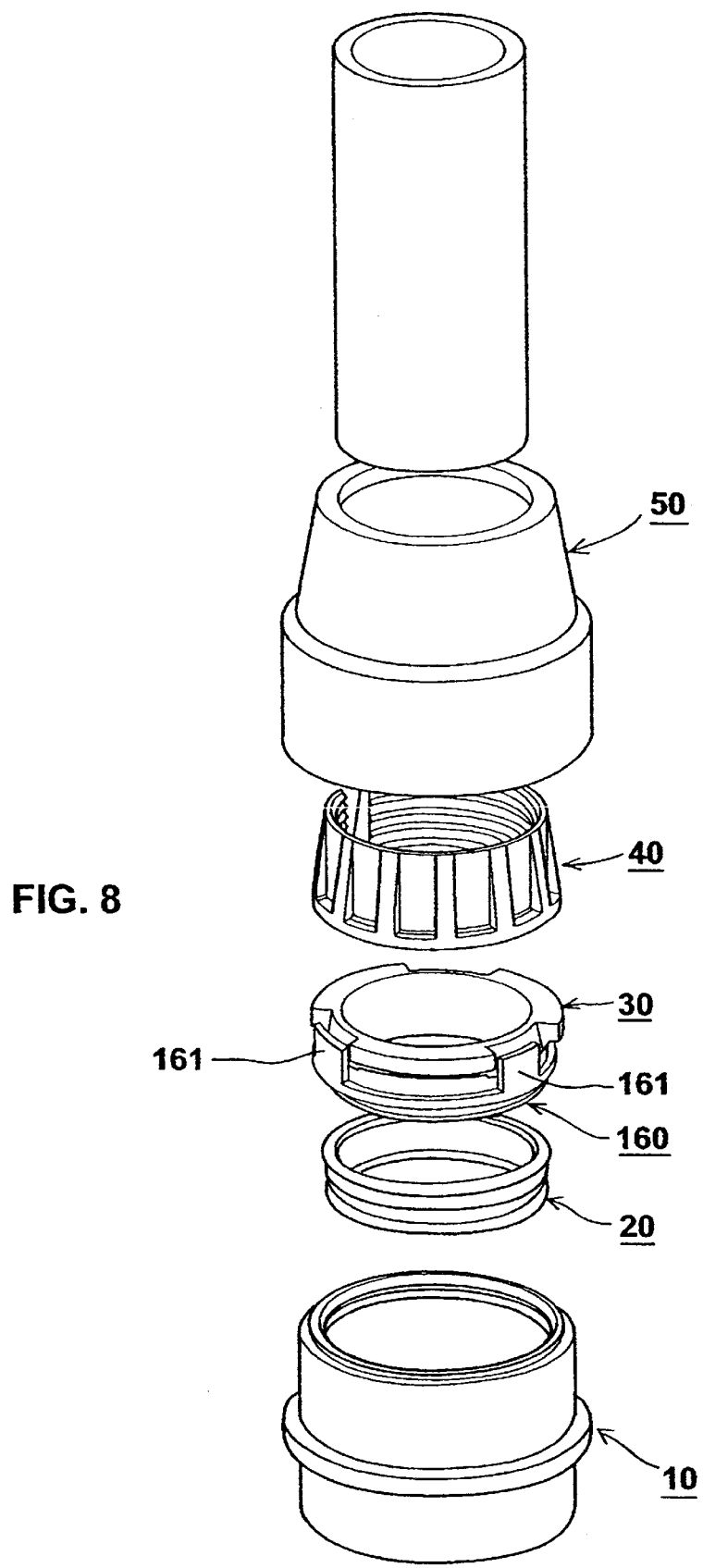
FIG. 8 is a view similar to that of FIG. 7, but showing the abutment ring between the sealing ring and the compression sleeve.

Fig. 8 illustrates the variation wherein the abutment ring 160 is interposed between the sealing ring 20 and the compression sleeve 30, and includes the axially-extending limit elements 161 in the form of fingers facing the gripping ring 40 --

Column 4,
Line 5, after "having" insert -- an end face at --
Line 19, after "element" insert -- exteding axially --
Line 24, after "element" insert -- engages said body member and --

Column 5,
Line 44, after "end" insert -- and a middle rib inbetween --
Lines 47-48, cancel "sealing ring is also integrally formed with a -- and insert after "rib" the word -- is --

UNITED STATES PATENT AND TRADEMARK OFFICE
CERTIFICATE OF CORRECTION

PATENT NO. : 6,378,915 B1
DATED : April 30, 2002
INVENTOR(S) : Oded Katz

It is certified that error appears in the above-identified patent and that said Letters Patent is hereby corrected as shown below:

Column 6,
Lines 46-47, cancel "at the end thereof opposite to that formed with" and substitute therefor -- projecting radially inwardly of the bore at a location spaced axially outwardly from --
Line 49, cancel "dimensioned" and substitute therefor -- at an intermediate on its outer surface located to engage said annular rib and --

Signed and Sealed this

Twenty-fifth Day of January, 2005

JON W. DUDAS
*Director of the United States Patent and Trademark Office*